United States Patent [19]
Williams

[11] 3,712,561
[45] Jan. 23, 1973

[54] TAPE REEL HOLD DOWN MECHANISM

[75] Inventor: James Edgar Williams, Hackettstown, N.J.

[73] Assignee: Bell Telephone Laboratories, Incorporated, Murray Hill, Berkeley Heights, N.J.

[22] Filed: March 16, 1971

[21] Appl. No.: 124,712

[52] U.S. Cl. .......... 242/68.3
[51] Int. Cl. .......... B65h 17/02
[58] Field of Search .......... B65h/17/02; 242/68.3; 287/52.07

[56] References Cited

UNITED STATES PATENTS

| | | | |
|---|---|---|---|
| 3,565,360 | 2/1971 | Ura | 242/68.3 |
| 3,198,454 | 8/1965 | Gorsek | 242/68.3 |
| 3,366,343 | 1/1968 | Messamer | 242/68.3 |
| 3,307,797 | 3/1967 | McFeaters | 242/68.3 |

*Primary Examiner*—Stanley N. Gilreath
*Assistant Examiner*—Edward J. McCarthy
*Attorney*—R. J. Guenther and Kenneth B. Hamlin

[57] ABSTRACT

A tape reel hold down mechanism for properly seating and firmly clamping a tape reel to a turntable substantially comprises a base rigidly attached to the turntable, an actuating knob rotatable relative to the base and including a plurality of crank pins, a plurality of links each having one end responsive to the circular motion of an associated crank pin for seating the tape reel on the turntable with their other end and a plurality of clamping means each responsive to the motion of a lost motion slot on an associated link for applying an outward radial clamping force to the inner diameter of the tape reel. In a particular embodiment of the invention, the clamping means includes a thin rubber pad and a preloaded compression spring assembly.

5 Claims, 10 Drawing Figures

INVENTOR
BY J.E. WILLIAMS

J.P. Kearns
ATTORNEY

TAPE REEL HOLD DOWN MECHANISM

FIELD OF THE INVENTION

This invention relates to reel hold down mechanisms and in particular to such mechanisms which utilize a lost motion slot to assure proper seating of the reel before application of the outward radial clamping force.

BACKGROUND OF THE INVENTION

In conventional magnetic tape machines, the tape is wound on plastic or metal reels. The reel generally includes a central opening to accommodate a mechanism which serves to properly hold the reel relative to a turntable. If the reel is not properly positioned, the tape may scrape against the side of the reel thereby causing damage to the tape. In prior art tape reel hold down mechanisms which depend on the compression of rubber elements, undesirable variations in the reel clamping force occur and sticking of the rubber elements to the reel result in reel removal difficulties. It is apparent that the above considerations are equally applicable to motion picture reels and the like.

It is therefore an object of this invention to provide a tape reel hold down mechanism which assures proper seating and firm clamping of a tape reel to a turntable.

It is another object of this invention to provide a tape reel hold down mechanism which does not exhibit undesirable variations in the reel clamping force.

SUMMARY OF THE INVENTION

According to the present invention, a tape reel hold down mechanism for properly seating and firmly clamping a tape reel to a turntable substantially comprises a base rigidly attached to the turntable, an actuating knob rotatable relative to the base and including a plurality of crank pins, a plurality of links each having one end responsive to the circular motion of an associated crank pin for seating the tape reel on the turntable with their other end, and a plurality of clamping means each responsive to the motion of a lost motion slot on an associated link for applying an outward radial clamping force to the inner diameter of the tape reel.

According to a specific embodiment of the tape reel hold down mechanism, the clamping means includes a thin rubber pad and a preloaded compression spring assembly.

It is a feature of this invention that the clamping force applied to the tape reel is predetermined by mechanism parameters.

It is another feature of this invention that the clamping force applied to the tape reel is predetermined by a preloaded compression spring assembly.

It is a further feature of this invention that the tape reel is automatically seated against an axial stop before application of the outward radial clamping force.

It is a still further feature of this invention that the tape reel is automatically seated against an axial stop by a plurality of links before application of the outward radial clamping force.

It is a still further feature of this invention that it utilizes a lost motion slot to assure proper seating of the tape reel before application of the outward radial clamping force.

It is a still further feature of this invention that it utilizes a lost motion slot to assure positive retraction of the clamping assembly.

It is a still further feature of this invention that rotation of a knob effects both axial seating and radial clamping of the reel.

It is a still further feature of this invention that over-center motion of the links effects a yieldable detent or snap action to stably clamp the inside diameter of the reel.

It is an advantage of this invention that it allows rapid mounting and dismounting of a tape reel from a turntable.

It is another advantage of this invention that the reel may be seated and clamped to the turntable without regard to their relative angular position.

It is a further advantage of this invention that the magnitude of the radial clamping force is easily controllable.

DESCRIPTION OF THE DRAWING

The above and other objects, advantages, and features of this invention are better appreciated by a consideration of the following detailed description and the drawing in which.

DETAILED DESCRIPTION

Figure 1A:
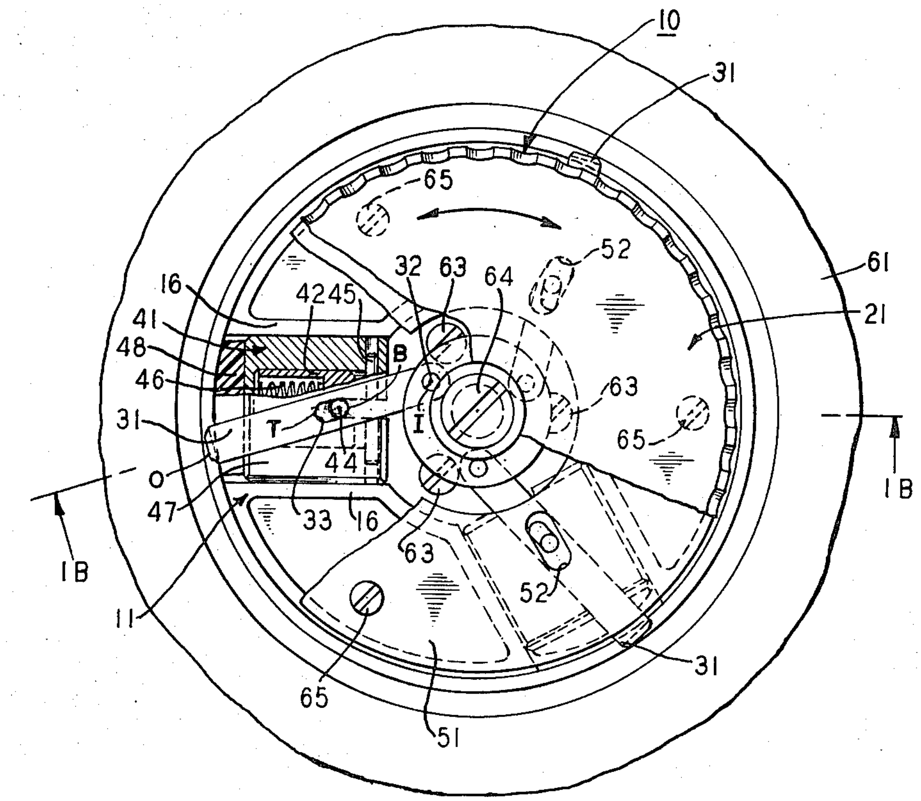
FIG. 1A is a top view, partially fragmentary, of a tape reel hold down mechanism according to the present invention.
Figure 1B:
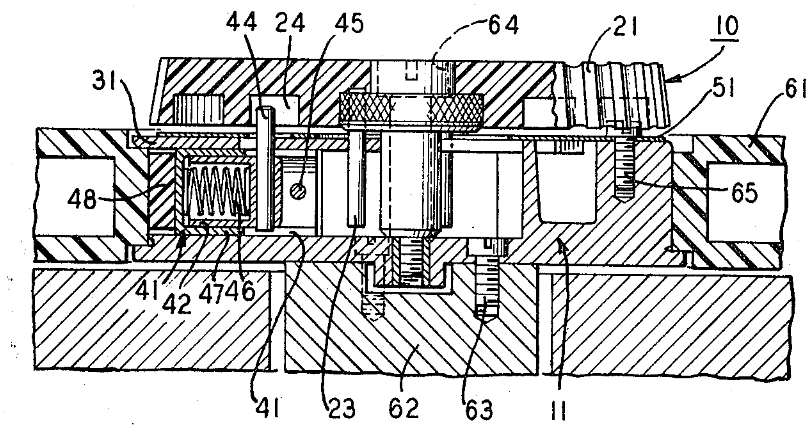
FIG. 1B is a cross-sectional view taken along line 1B of FIG. 1A.

Referring to FIGS. 1A and 1B, tape reel hold down mechanism 10, which seats and clamps tape reel 61 to turntable 62, substantially comprises bass 11, actuating know 21, three links 31, and three clamping assemblies 41. Mechanism 10 further comprises spring plate 51, which is located between knob 21 and base 11, for applying a downward axial force to links 31. Turntable 62 is rotatably driven by a motor, not shown. While the hold down mechanism of the present invention is being described in terms of its application to a magnetic tape reel, it will be apparent to those skilled in the art that the invention is equally applicable to motion picture reels and the like.

Figure 2A:
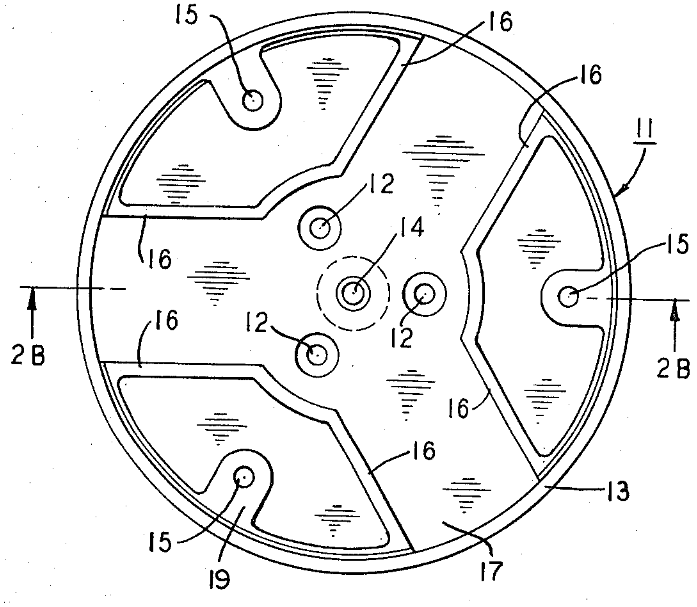
FIG. 2A is a top view of the base utilized in the mechanism of FIG. 1A.
Figure 2B:
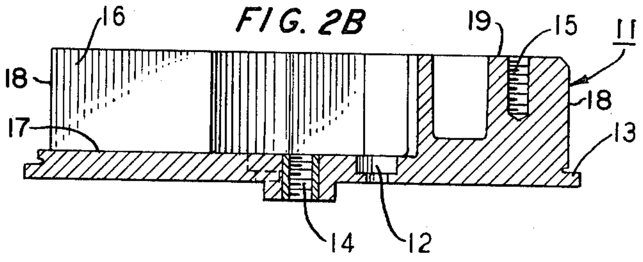
FIG. 2B is a cross-sectional view taken along line 2B of FIG. 2A.

Referring now to FIGS. 2A and 2B, base 11 includes three equally spaced unthreaded through holes 12, axial stop or annular shoulder 13, threaded through hole 14, three equally spaced threaded holes 15, and guide surfaces 16. Thus, from FIGS. 1A and 1B, base 11 is rigidly attached to turntable 62 via holes 12 utilizing mechanical fastening means such as screws 63.

Also, when properly seated, reel 61 rests on annular shoulder 13. The outer diameter of base 11, not including annular shoulder 13, serves as a pilot diameter for reel 61. Base 11 and knob 21 are rotatably attached via threaded hole 14 utilizing shoulder screw 64. Further, spring plate 51 is rigidly attached to base 11 via threaded holes 15 utilizing screws 65. Finally, surfaces 16 constrain the motion of clamping assemblies 41 to the radial direction. From the above, base 11 can be regarded as a cylindrical block comprising vertically directed circumferential surfaces 18 and including three radially directed channels formed by lower horizontal surface 17 and associated pairs of parallel vertical walls or surfaces 16.

Figure 3B:
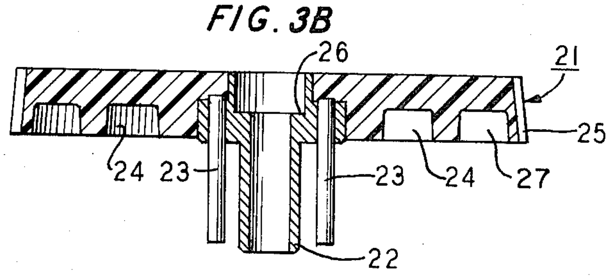
FIG. 3B is a cross-sectional view taken along line 3B of FIG. 3A.
Figure 3A:
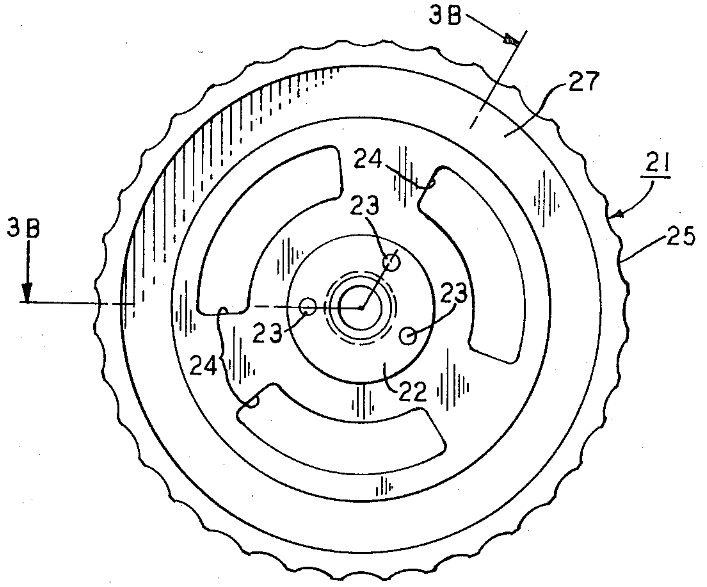
FIG. 3A is a bottom view of the actuating knob utilized in the mechanism of FIG. 1A.

Referring to FIGS. 3A and 3B, actuating knob 21 includes knurled hub 22, three equally spaced crank pins 23, three equally spaced circumferentially directed slots or positive stops 24, and a plurality of equally spaced grooves 25. Thus, from FIGS. 1A and 1B, hub 22, which includes shoulder or step 26, in combination with shoulder screw 64 restrains the axial motion of knob 21 relative to base 11 and allows for rotary motion of knob 21 relative to base 11, as noted before. Also, crank pins 23 transfer their circular motion to the inner end of their respective link 31. Further, slots 24 interact with plunger pin 44 of clamping assembly 41 to constrain the rotary motion of knob 21 to approximately 90°. Finally, vertically directed grooves 25 facilitate the manual rotation of knob 21 relative to base 11. Further, annular slot 27 provides space for the unimpared rotation of knob 21 relative to screws 65. Finally, the outer diameter of knob 21 is approximately equivalent to the outer diameter of base 11, not including annular shoulder 13, in order to allow free insertion of reel 61 onto device 10.

Figure 4A:
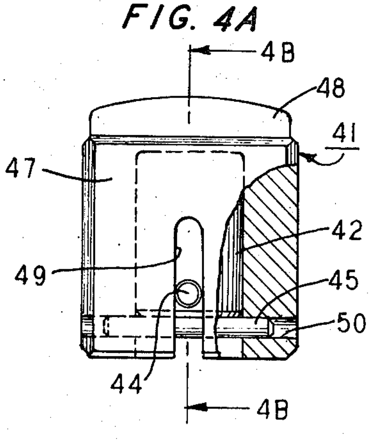
FIG. 4A is a side view, partially fragmentary, of the clamping assembly utilized in the mechanism of FIG. 1A.
Figure 4B:
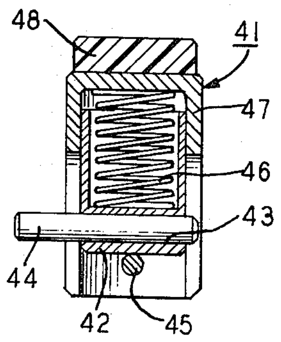
FIG. 4B is a cross-sectional view taken along line 4B of FIG. 4A.

Referring to FIGS. 4A and 4B, clamping assembly 41, which is responsive to the motion of lost motion slot 33 on associated link 31 for applying an outward radial clamping force to the inner diameter of reel 61, includes hollow plunger 42, plunger pin 44, plunger stop pin 45, preloaded compression spring 46, hollow clamping block 47, and thin frictional pad 48. Plunger 42 further includes circular bore 43 into which plunger pin 44 is press fitted, while block 47 further includes circular bore 50 into which plunger stop pin 45 is fitted. Also, plunger 42 is slidably fitted within block 47, while spring 46 is compressed therebetween. Plunger stop pin 45 assures that plunger 42 is not pushed out of block 47 by spring 46. In other words, plunger stop pin 45, which is fixed relative to block 47, traps plunger 42 against the preload compression of spring 46. Block 47 further includes longitudinal guide slot 49 for constraining the motion of plunger pin 44. It is therefore apparent that spring 46 is initially preloaded and that motion of plunger pin 44 relative to block 47 along slot 49 causes spring 46 to be further compressed. The final compressive force within spring 46 is determined by the initial compressive force, the spring constant, and the net amount of relative motion between plunger pin 44 and block 47. It is this final compressive force which is applied by frictional pad 48 to the inner diameter of reel 61. However, it should be noted that unless a retarding or reaction force is applied by reel 61 to frictional pad 48, the compressive force within spring 46 remains constant at the initial preload value. In other words, during certain phases of the clamping procedure, clamping assembly 41 moves radially inward and radially outward as a free body without effecting a change in the spring compression. In such cases, plunger 42 remains seated on plunger stop pin 45. Pad 48, which is advantageously made of rubber, is attached to block 47 using well-known techniques. As can be seen In FIG. 4A, frictional pad 48 has a curved outwardly directed surface which is adapted to press upon the inner diameter of reel 61. Further, clamping assembly 41, as a whole, is adapted to move radially outward along the channel formed by surfaces 16 and 17 and spring plate 51. It is apparent that the degree of coupling between assembly 41 and reel 61 is substantially determined by the stiffness of spring 46.

Referring back to FIGS. 1A and 1B, link 31, whose inner end is responsive to the circular motion of associated crank pin 23, includes through hole 32 and lost motion slot 33. Crank pin 23 of knob 21 fits into hole 32. Lost motion slot 33 applies a portion of the motion of link 31 to clamping assembly 41 via plunger pin 44. In other words, link 31 is rotatably attached to crank pin 23 at inner end I, pin 23 being inserted through hole 32 of the link. Therefore, each link is adapted to rotate about its associated crank pin while each crank pin moves along its own circular path. In other words, rotary motion of knob 21 is transferred into motion of crank pins 23 along a circular path, this circular motion being transferred to link 31 at inner end I. Crank pins 23 are uniformly distributed along the circumference of a circle which has its center coincident with the turntable's axis of rotation. Further, outer end O of link 31 is located within the associated channel when clamping assembly 41 is in the fully retracted position, whereas outer end O protrudes beyond the outer end of the channel when clamping assembly 41 is in the fully clamped position. This will be further discussed with reference to FIGS. 1A and 6.

Lost motion slot 33, which is an elongated hole in link 31 directed along the length thereof, includes inner end B which is adjacent to inner end I of the link, outer end T which is adjacent to outer end O of the link, and an intermediate portion located between ends B and T thereof. As will be further explained hereinafter, plunger pin 44, which is inserted into lost motion slot 33, responds to the motion of ends T and B of the lost motion slot. As shown in FIG. 1, links 31 lie in a common plane which is perpendicular to the turntable's axis of rotation, the motion of these links being constrained to this plane.

Figure 5:
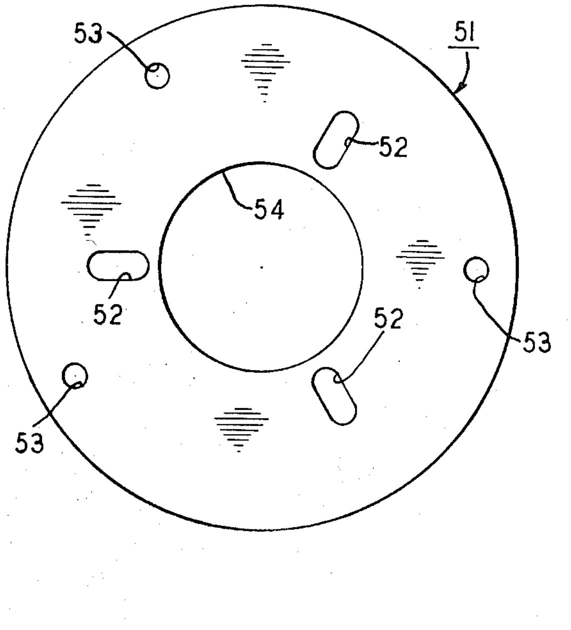
FIG. 5 is a top view of the spring plate utilized in the mechanism of FIG. 1A.

Referring now to FIG. 5, spring plate 51 includes three equally spaced radially directed slots 52, three equally spaced holes 53, and central hole 54. Slots 52 allow for the radial motion of plunger pins 44, as shown in FIG. 1A. Plate 51 is rigidly attached to upper horizontal surface 19 of base 11 via holes 53 utilizing mechanical fastening means such as screws 65, as shown in FIGS. 1A and 1B. Further, the diameter of hole 54 is made large enough to allow free circular motion of crank pin 23 and to facilitate assembly of mechanism 10. It will be recalled that plate 51 provides a downward axial force to links 31 for seating reel 61 on annular shoulder 13 of base 11. Such axial seating of reel 61 occurs prior to radial clamping of the reel by means of assembly 41. However, plate 51 also serves to capture links 31 and clamping assemblies 41 between itself and base 11 to effect a unitary structure. Therefore, removal of mechanism 10 from turntable 62 is done by first removing shoulder screw 64 which holds knob 21 to base 11, lifting knob 21, and, finally, removing screws 63 which hold base 11 to turntable 62. Plate 51 is advantageously made of phosphor-bronze.

Figure 6:
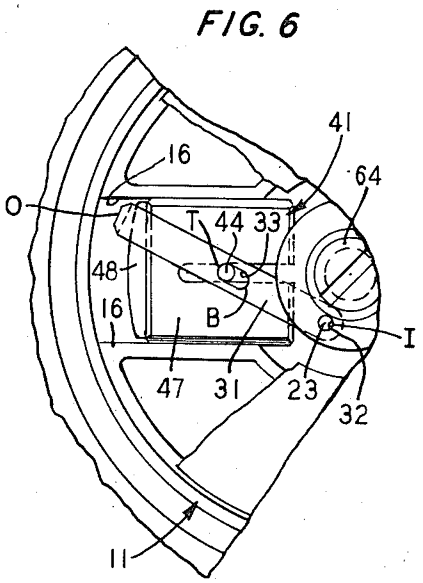
FIG. 6 is a detailed view showing the clamping assembly in the fully retracted position.

The operation of mechanism 10 is now described with reference to FIGS. 6 and 1A which respectively show a clamping assembly in the fully retracted position and in the fully clamped position. It will be recalled that crank pin 23 of knob is inserted into hole 32 of link 31 while plunger pin 44 of clamping assembly 41 is inserted into lost motion slot 33 of the link. In this particular embodiment, rotation of knob 21 is limited to approximately 90° or a quarter of a turn by the interaction of plunger pin 44 and the extreme ends or limits of slot 24. Seating and clamping of reel 61 is effected by clockwise (CW) rotation of knob 21 about the axis of rotation of turntable 62. It will be apparent to those skilled in the art that CW rotation of knob 21 is accompanied by simultaneous counterclockwise (CCW) rotation of link 31 about crank pin 23. As shown in FIG. 6, clamping assembly 41 is in the fully retracted position. In this position, outer end T of lost motion slot 33 is in contact with plunger pin 44 of clamping assembly 41. Also, plunger 42 of the assembly is in contact with plunger stop pin 45. Further, end O of link 31 is located completely within the radially directed channel which is formed by surfaces 16 and 17 and spring plate 51. During the first phase of the knob's CW rotation, end T of lost motion slot 33 loses contact with plunger pin 44 while end O of link 31 moves outward along the channel. During this first phase, plunger pin 44 slides relative to the intermediate portion of lost motion slot 33. However, plunger pin 44 and clamping assembly 41, as a whole, remain stationary. This of course, yields the so-called lost motion of the link. Further, plunger 42 remains in contact with plunger stop pin 45. This first phase of the knob's CW rotation ends when end B of lost motion slot 33 comes in contact with plunger pin 44. Therefore, lost motion of link 31 occurs from the time that outer end T of the slot loses contact with pin 44 until the time that inner end B of the slot makes contact with the pin. During the second phase of the knob's CW rotation, while end B of the slot is in contact with pin 44, clamping assembly 41 moves radially outward as a free body, plunger 42 remaining in contact with plunger stop pin 45. By this time, end O of link 31 has moved out beyond the outer end of the channel and has come in contact with the upper surface of reel 61 to cause downward axial seating of the reel. This, of course, results from the interaction of link 31 and spring plate 51. This second phase of the knob's CW rotation ends when pad 48 of clamping assembly 41 makes contact with the inner diameter of reel 61. It should be noted that if reel 61 has been pushed only partially onto base 11 by the operator, outer end O of link 31 either will not allow further CW rotation of the knob, thereby warning the operator, or will push reel 61 into the proper position onto annular shoulder 13, thereby allowing further CW rotation of the knob. During the third phase of the knob's CW rotation, while end B of the slot is in contact with pin 44, the force applied to plunger pin 44 by end B of lost motion slot 33 rises from value of 0 to the initial compressive spring load. Thereafter, plunger 42 loses contact with plunger stop pin 45 and moves radially outward. Therefore, the radial outward force applied to pin 44 by link 31, and, in turn, the radial clamping force applied to the inner diameter of reel 61 by pad 48, continuously increases as the knob is further rotated in the CW direction. Of course, end O of the link moves further outward. However, seating of the reel has already been effected, as was mentioned above. This third phase of the knob's CW rotation ends when link 31 is colinear with the radial direction. This position of link 31 is called the over-center position. Again, end B of the slot is in contact with pin 44. When link 31 is in this position, plunger 42 is displaced a maximum amount from plunger stop pin 45. Therefore, the radial clamping force applied to the inner diameter of the reel is at its maximum value. In addition, end O of link 31 protrudes a maximum amount from the outer end of the channel; however, as was mentioned before, seating of the reel has already been effected. It will be apparent to those skilled in the art that a slight amount of further CW rotation of the knob will be accompanied by a sudden detent or snap action in the CW direction. This is so because a CW torque is being applied to the knob by the compressive forces within the spring. During the fourth phase of the knob's CW rotation, the so-called detent or snap action is effected. However, CW rotation of the knob beyond the over-center position is limited by the interaction of plunger pin 44 and the end or limit of slot 24. During this detent motion, plunger 42 moves radially inward relative to plunger stop pin 45 by a slight amount. Therefore, the compressive force within the spring also decreases by a slight amount. However, a sufficient compressive spring force remains to be applied to the inner diameter of the reel. In addition, end O of link 31 also moves inward by a slight amount. However, end O protrudes sufficiently beyond the outer end of the channel to be in contact with the upper surface of the reel. Again, end B of the slot is in contact with pin 44. In conclusion, assembly 41 remains stably engaged with reel 61. FIG. 1A shows assembly 41 in the fully clamped position.

Unseating and unclamping of reel 61 is effected by CCW rotation of knob 21. It will be apparent to those skilled in the art that CCW rotation of the knob is accompanied by simultaneous CW rotation of link 31 about crank pin 23. As mentioned before, FIG. 1A shows clamping assembly 41 in the fully clamped position. In this position, inner end B of the slot is in contact with pin 44. During the first phase of the knob's CCW rotation, end B of lost motion slot 33 pushes plunger pin 44 radially outward away from plunger stop pin 45, thereby continuously increasing the spring's compressive force from its value when the assembly is in the fully clamped position to its maximum value. In addition, end O of link 31 also further protrudes from the outer end of the channel. This first phase of the knob's CCW rotation ends when link 31 reaches its over-center position. While link 31 is in this over-center position, plunger pin 44 is a maximum distance away from plunger stop pin 45. Therefore, the spring's compressive force is at a maximum while the radial clamping force applied to the inner diameter of the reel is also at a maximum. Again, end O of link 31 protrudes a maximum amount away from the outer end of the channel. Of course, inner end B of the slot is in contact with pin 44. It is apparent that a slight amount of further CCW rotation of the knob will be accompanied by a sudden detent or snap action in the CCW rotation. Therefore, during the second phase of the knob's CCW rotation, i.e., during the detent or snap action, plunger 42 approaches and makes contact with plunger stop pin 45. This, of course, results in a decrease of the spring's compressive force from its maximum amount to the initial amount. Slight further CCW rotation beyond the point when plunger 42 contacts plunger stop pin 45 results in the decrease of the radial outward clamping force from a value which is equivalent to the spring's initial compression to a value of 0. During this phase, end O of link 31 moves inwardly while inner end B of the slot remains in contact with pin 44. During the third phase of the knob's CCW rotation, plunger pin 44 loses contact with end B of lost motion slot 33. Thereafter, plunger pin 44 moves relative to the intermediate portion of the lost motion slot and finally approaches end T of the slot. During this third phase, end O of link 31 moves further inward. This, of course, yields lost motion of link 31, during which time assembly 41 remains stationary and in contact with the inner diameter of the reel. This phase comes to an end when end T of lost motion slot 33 makes contact with plunger pin 44. By this time, outer end O of link 3 is no longer in contact with the upper surface of the reel. During the fourth phase of the knob's CCW rotation, clamping assembly 41 moves radially inward as a free body as end T of lost motion slot 33 acts upon plunger pin 44. In addition, during this phase, outer end O of link 31 is fully retracted within the channel. FIG. 6 shows clamping assembly 41 in the fully retracted position. At this point, therefore, reel 61 can be removed and replaced by a new reel.

While the arrangement according to this invention for seating and clamping a tape reel to a turntable has been described in terms of a specific embodiment, it will be apparent to one skilled in the art that many modifications are possible within the spirit and scope of the disclosed principle.

What is claimed is:

1. In combination with a turntable having an axis of rotation, a device for seating and then clamping a reel having an inner diameter to said turntable comprising:

a base rigidly attached to said turntable, said base being adapted to receive the inner diameter of said reel and including an axial stop and a plurality of radially directed guide surfaces, actuating means rotatable relative to said axis and including a plurality of crank pins, said crank pins being parallel to said axis and uniformly distributed along the circumference of a circle having its center coincident with said axis, a plurality of links each including a lost motion slot directed along the length thereof, said links being located and constrained to move along a plane which is perpendicular to said axis, the first end of each link being pivotally attached to an associated crank pin, and the first end of each slot being nearer said associated crank pin, and a plurality of clamping means each radially guided by said guide surfaces and interacting with the lost motion slot of an associated link, rotation of said actuating means in a first direction causing the first end of each link to respond to the circular motion of its associated crank pin and causing the lost motion slot of said link to interact with its associated clamping means whereby said link rotates about said associated crank pin in the opposite direction, the second end of said link protruding beyond the outer periphery of said base for seating said reel on said axial stop and said associated clamping means responding to the motion of the first slot end on said link for applying an outward radial clamping force to the inner diameter of said reel, and rotation of said actuating means in said opposite direction causing the first end of said link to respond to the circular motion of said associated crank pin and causing the lost motion slot of said link to interact with said associated clamping means whereby said link rotates in said first direction about said associated crank pin, the second end of said link moving inwardly relative to the outer periphery of said base for releasing said reel from said axial stop and said associated clamping means responding to the motion of the other slot end on said link for removing said outward radial clamping force from the inner diameter of said reel.

2. The device of claim 1 further comprising a spring plate located between said actuating means and said base for applying an axially directed force to said links.

3. The device of claim 1 wherein said axial stop is an annular shoulder area located along the outer periphery of said base.

4. The device of claim 1 wherein said actuating means further comprises a plurality of equally spaced circumferentially directed slots for constraining the motion of said actuating means within fixed limits.

5. The device of claim 1 wherein each of said clamping means further comprises:

a hollow plunger, a plunger pin fixed relative to said plunger, a hollow clamping block including a longitudinally directed guide slot, a plunger stop pin fixed relative to said block, a spring, said plunger being slidably fitted within said block, said spring being compressed between said plunger and said block, said plunger stop pin trapping said plunger against the compressive force of said spring, and the motion of said plunger pin being constrained along said longitudinal guide slot when said plunger moves relative to said block, and a frictional pad attached to said block for clamping said reel.

* * * * *